(12) United States Patent
Pringle, IV et al.

(10) Patent No.: US 11,642,694 B2
(45) Date of Patent: *May 9, 2023

(54) ROBOT END EFFECTOR FOR DISPENSING AN EXTRUDABLE SUBSTANCE

(71) Applicant: THE BOEING COMPANY, Chicago, IL (US)

(72) Inventors: John Walter Pringle, IV, Torrance, CA (US); Angelica Davancens, Reseda, CA (US); Ryan Vutha Touch, Irvine, CA (US); Dehwei Oliver Hsu, Cypress, CA (US)

(73) Assignee: The Boeing Company, Chicago, IL (US)

( * ) Notice: Subject to any disclaimer, the term of this patent is extended or adjusted under 35 U.S.C. 154(b) by 347 days.

This patent is subject to a terminal disclaimer.

(21) Appl. No.: 16/882,421

(22) Filed: May 22, 2020

(65) Prior Publication Data

US 2021/0362348 A1 Nov. 25, 2021

(51) Int. Cl.
| | |
|---|---|
| *B05C 11/10* | (2006.01) |
| *B25J 15/00* | (2006.01) |
| *B05C 5/00* | (2006.01) |
| *B05C 5/02* | (2006.01) |

(52) U.S. Cl.
CPC ............ *B05C 11/1036* (2013.01); *B05C 5/00* (2013.01); *B05C 5/0216* (2013.01)

(58) Field of Classification Search
USPC ......... 118/421, 679, 669, 698; 222/137, 389
See application file for complete search history.

(56) References Cited

U.S. PATENT DOCUMENTS

| | | | | |
|---|---|---|---|---|
| 5,184,758 A | * | 2/1993 | Keller .................. | B05C 17/015 222/137 |
| 2019/0315059 A1 | * | 10/2019 | Budge .................. | C22C 47/025 |
| 2019/0344293 A1 | * | 11/2019 | Knott .................... | B05B 12/004 |

* cited by examiner

*Primary Examiner* — Yewebdar T Tadesse
(74) *Attorney, Agent, or Firm* — Kwan & Olynick LLP (57) ABSTRACT

A robot end effector for dispensing an extrudable substance comprises a chassis and cartridge bays, attached to the chassis and each shaped to receive a corresponding one of two-part cartridges. Robot end effector also comprises a dispensing valve, attached to the chassis and comprising a valve inlet and a valve outlet, in selective fluidic communication with the valve inlet. Robot end effector further comprises a manifold, comprising a manifold outlet and manifold inlets. The manifold outlet is in fluidic communication with the valve inlet. Robot end effector additionally comprises a plunger assembly, comprising pairs of plungers. Plunger assembly is arranged to concurrently extrude contents of the two-part cartridges through the cartridge outlets when the two-part cartridges are received by the cartridge bays. Robot end effector also comprises a non-rotating linear pneumatic actuator, configured to selectively move the plunger assembly relative to the chassis.

20 Claims, 10 Drawing Sheets

ROBOT END EFFECTOR FOR DISPENSING AN EXTRUDABLE SUBSTANCE

GOVERNMENT LICENSE RIGHTS

This invention was made with Government support under FA8650-12-2-5503 awarded by Department of Defense. The government has certain rights in this invention.

TECHNICAL FIELD

The present disclosure relates to apparatuses and methods for depositing an extrudable substance onto a surface.

BACKGROUND

During assembly of a structure, such as a solar panel or a component of an aircraft or a spacecraft, an extrudable substance must often be deposited from a two-part cartridge onto a surface of the structure. It is desirable to fully automate such deposition of the extrudable substance to reduce cost and manufacturing lead time. It also desirable to use commercial off-the-shelf two-part cartridges to reduce cost. However, in many instances, each commercial off-the-shelf two-part cartridge yields only a relatively small amount of the extrudable substance. In such instances, automation of the deposition process is limited by a frequent need to pause the automated system to manually replace an empty two-part cartridge with a full cartridge.

SUMMARY

Accordingly, apparatuses and methods, intended to address at least the above-identified concerns, would find utility.

The following is a non-exhaustive list of examples, which may or may not be claimed, of the subject matter, disclosed herein.

Disclosed herein is a robot end effector for dispensing an extrudable substance. The robot end effector comprises a chassis as well as cartridge bays, attached to the chassis and each shaped to receive a corresponding one of two-part cartridges. The robot end effector also comprises a dispensing valve, attached to the chassis and comprising a valve inlet and a valve outlet. The valve outlet is in selective fluidic communication with the valve inlet. The robot end effector further comprises a manifold, comprising a manifold outlet and manifold inlets, which are in fluidic communication with the manifold outlet. The manifold outlet is in fluidic communication with the valve inlet. When the two-part cartridges are received by the cartridge bays, the manifold inlets are in fluidic communication with corresponding ones of the two-part cartridges via static mixers, attached to cartridge outlets of the two-part cartridges. The robot end effector additionally comprises a plunger assembly, comprising pairs of plungers. The plunger assembly is arranged to concurrently extrude contents of the two-part cartridges through the cartridge outlets when the two-part cartridges are received by the cartridge bays. The robot end effector also comprises a non-rotating linear pneumatic actuator, attached to the chassis and configured to selectively move the plunger assembly relative to the chassis.

The robot end effector provides for depositing the extrudable substance from the two-part cartridges in a single automated deposition process, eliminating a need to pause, recover, and reload the robot end effector each time a single two-part cartridge is emptied. The cartridge bays enable loading and retention of the two-part cartridges on the robot end effector. The manifold is configured to channel the extrudable substance from each of the retained two-part cartridges into the valve inlet of the dispensing valve for deposition via the valve outlet. The non-rotating linear pneumatic actuator provides an efficient and inexpensive actuation mechanism to apply the pairs of plungers to each of the two-part cartridges to enable concurrent extrusion of the extrudable substance from the two-part cartridges.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1:
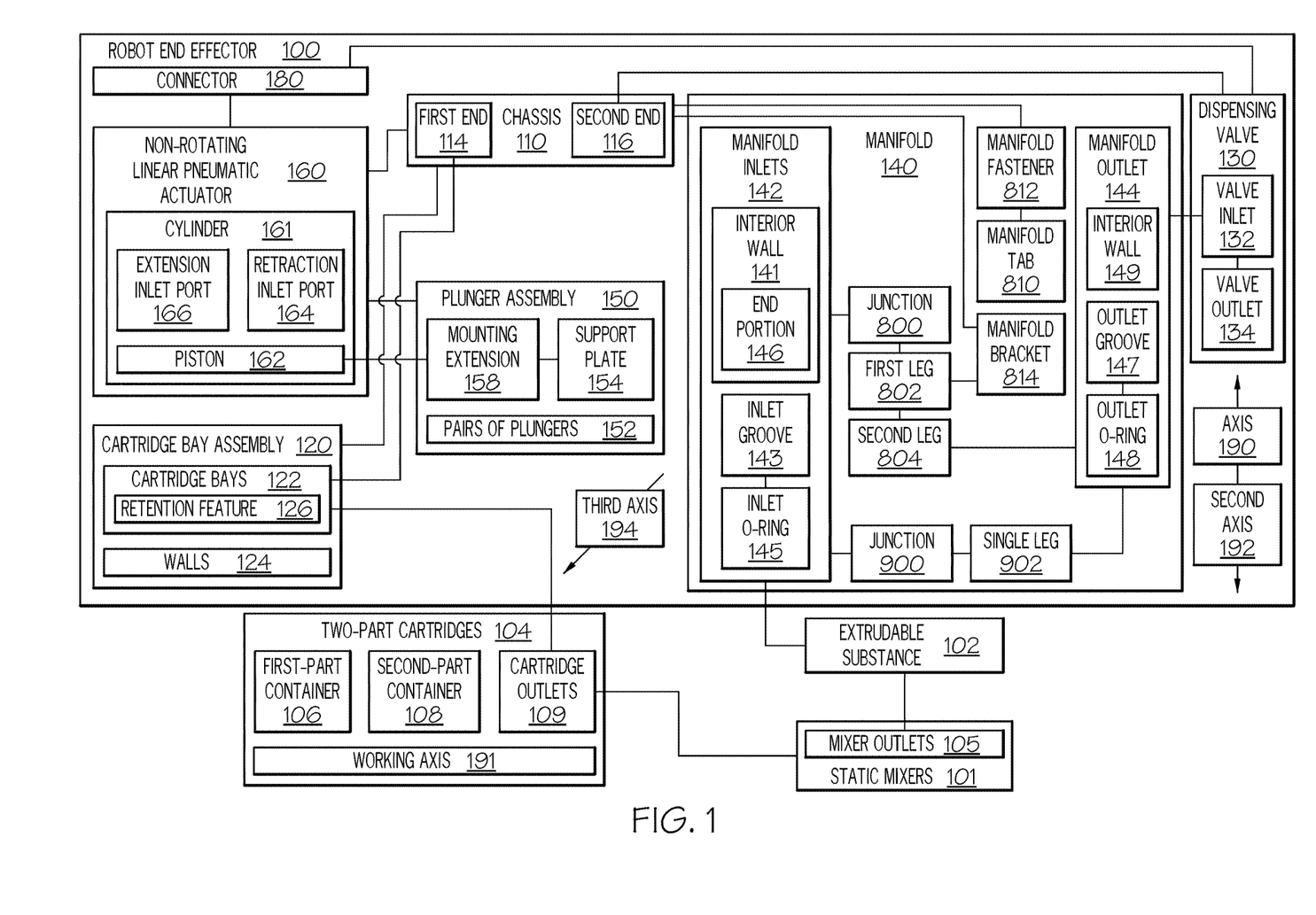
FIG. 1 is a block diagram of a robot end effector for dispensing an extrudable substance, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

For purposes of this disclosure, "along" means "coaxial with or parallel to."

Illustrative, non-exhaustive examples, which may or may not be claimed, of the subject matter, disclosed herein, are provided below.

Referring generally to FIG. 1, robot end effector 100 for dispensing extrudable substance 102 is disclosed. Robot end effector 100 comprises chassis 110 and cartridge bays 122, attached to chassis 110. Each of cartridge bays 122 is shaped to receive a corresponding one of two-part cartridges 104. Robot end effector 100 also comprises dispensing valve 130, attached to chassis 110 and comprising valve inlet 132 and valve outlet 134. Valve outlet 134 is in selective fluidic communication with valve inlet 132. Robot end effector 100 further comprises manifold 140, comprising manifold outlet 144 and manifold inlets 142, which are in fluidic communication with manifold outlet 144. Manifold outlet 144 is in fluidic communication with valve inlet 132. When two-part cartridges 104 are received by cartridge bays 122, manifold inlets 142 are in fluidic communication with corresponding ones of two-part cartridges 104 via static mixers 101, attached to cartridge outlets 109 of two-part cartridges 104. Robot end effector 100 additionally comprises plunger assembly 150, comprising pairs of plungers 152. Plunger assembly 150 is arranged to concurrently extrude contents of two-part cartridges 104 through cartridge outlets 109 when two-part cartridges 104 are received by cartridge bays 122. Robot end effector 100 also comprises non-rotating linear pneumatic actuator 160, attached to chassis 110 and configured to selectively move plunger assembly 150 relative to chassis 110. The preceding portion of this paragraph characterizes example one of the subject matter, disclosed herein.

Robot end effector 100 provides for depositing extrudable substance 102 from two-part cartridges 104 in a single automated deposition process, eliminating a need to pause, recover, and reload robot end effector 100 each time a single two-part cartridge is emptied. Cartridge bays 122 enable loading and retention of two-part cartridges 104 on robot end effector 100. Manifold 140 is configured to channel extrudable substance 102 from each of the retained ones of two-part cartridges 104 into valve inlet 132 of dispensing valve 130 for deposition via valve outlet 134. Non-rotating linear pneumatic actuator 160 provides an efficient and inexpensive actuation mechanism to apply pairs of plungers 152 to each of two-part cartridges 104 to enable concurrent extrusion of extrudable substance 102 from two-part cartridges 104.

Figure 5A:
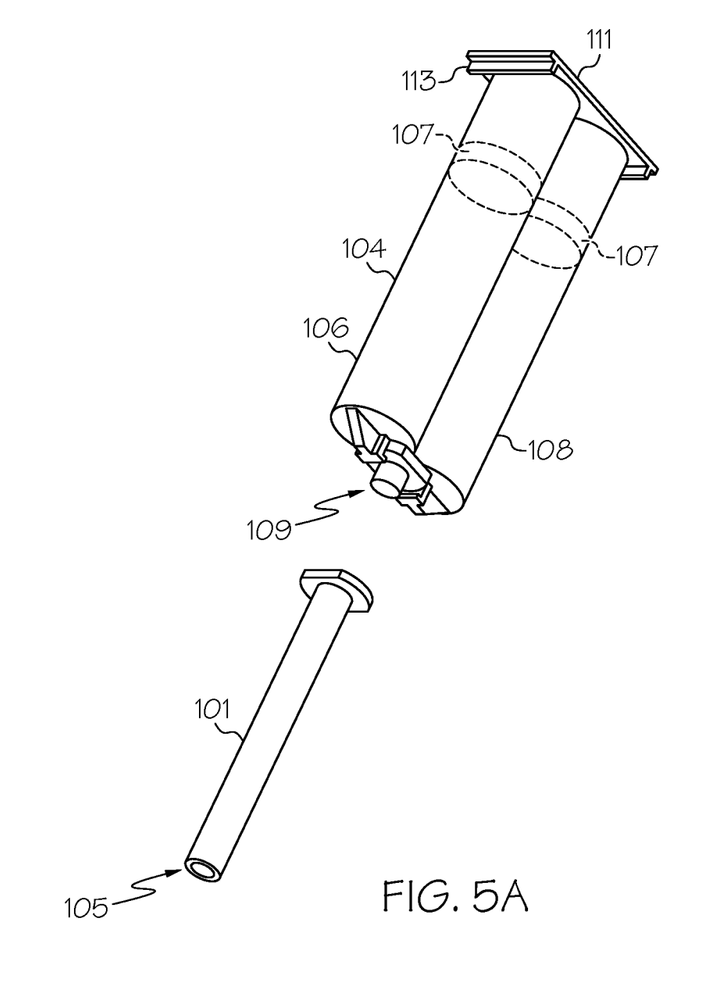
FIG. 5A is a schematic, perspective, exploded view of a two-part cartridge and static mixer for use with the robot end effector of FIG. 1, according to one or more examples of the subject matter, disclosed herein.
Figure 5B:
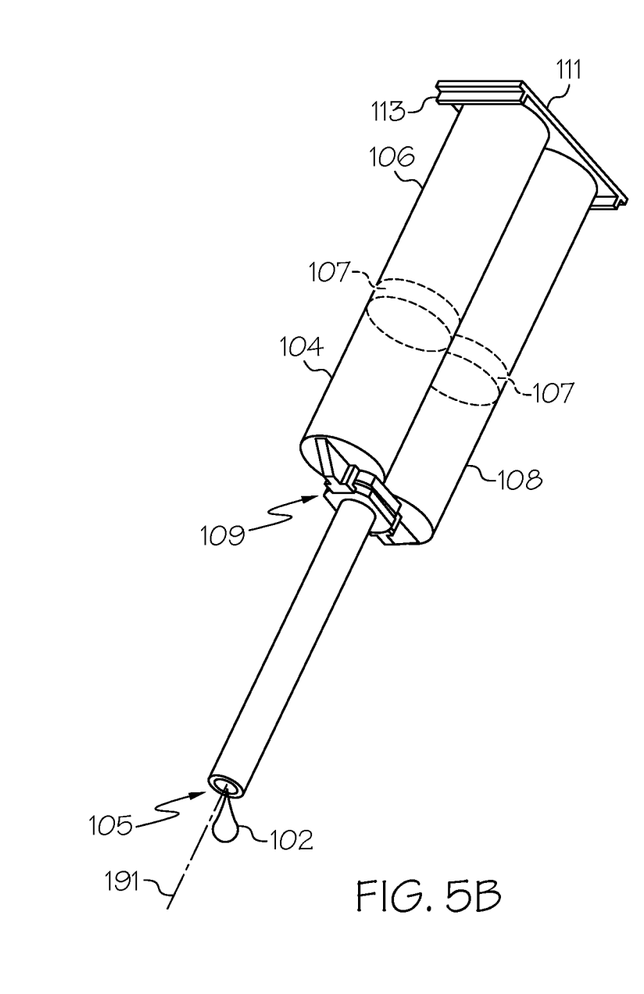
FIG. 5B is a schematic, perspective, assembled view of the two-part cartridge and static mixer of FIG. 4A, according to one or more examples of the subject matter, disclosed herein.

In one or more examples, and with reference also to FIGS. 5A and 5B, two-part cartridges 104 are commercial off-the-shelf items that each include first-part container 106 and second-part container 108. The contents of first-part container 106 and the contents of second-part container 108 are configured to be mixed together to yield extrudable substance 102, such as an adhesive. Typically, the contents of first-part container 106 and second-part container 108 must be kept separate until just before use because extrudable substance 102 solidifies soon after mixing, for example in less than an hour. First-part container 106 and second-part container 108 each include piston 107 disposed internally within and configured to force the respective contents of first-part container 106 and second-part container 108 out of cartridge outlet 109. In one or more examples, pairs of plungers 152 are arranged and actuated to engage, directly or indirectly, with pistons 107. Each static mixer is typically packaged with a two-part cartridge and is a tube, attachable to cartridge outlet 109. Each static mixer typically includes mixing vanes 115, configured to enhance mixing of the contents of first-part container 106 and second-part container 108 as they travel through the static mixer, such that extrudable substance 102 is suitably homogeneous upon exit from the mixer outlet of a static mixer.

Figure 3:
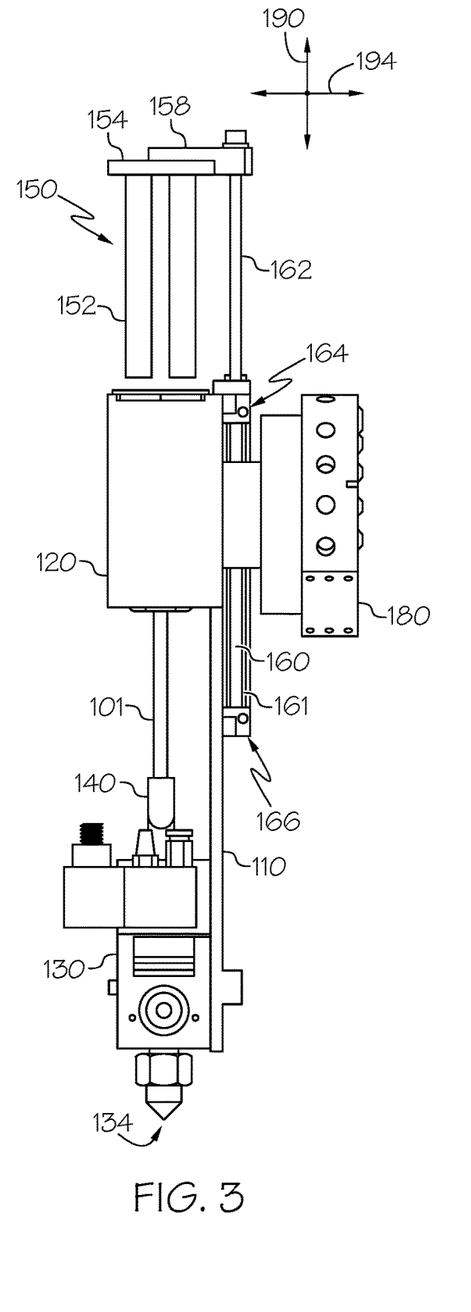
FIG. 3 is a schematic, side, elevation view of the robot end effector of FIG. 1, according to one or more examples of the subject matter, disclosed herein.
Figure 4:
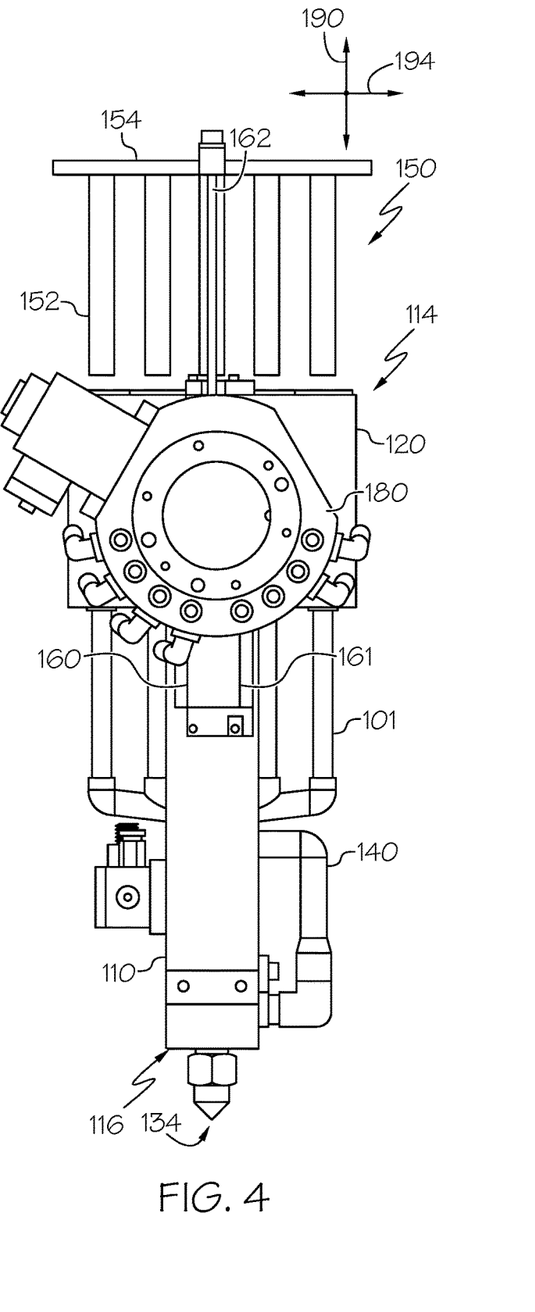
FIG. 4 is a schematic, back, elevation view of the robot end effector of FIG. 1, according to one or more examples of the subject matter, disclosed herein.
Figure 7A:
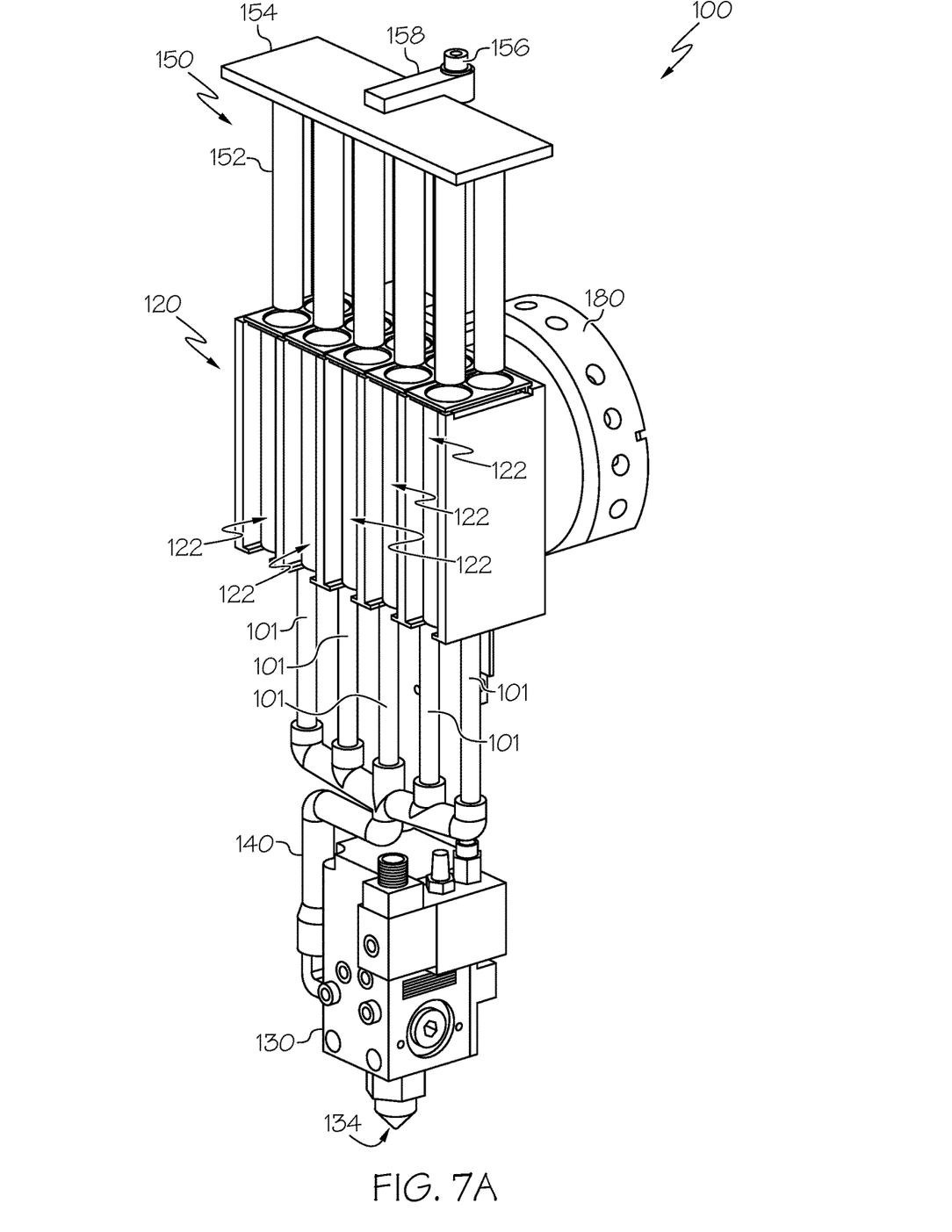
FIG. 7A is a schematic, perspective view of the robot end effector of FIG. 1, illustrating pairs of plungers positioned for insertion into the two-part cartridges of FIG. 5B received in the robot end effector, according to one or more examples of the subject matter, disclosed herein.
Figure 7B:
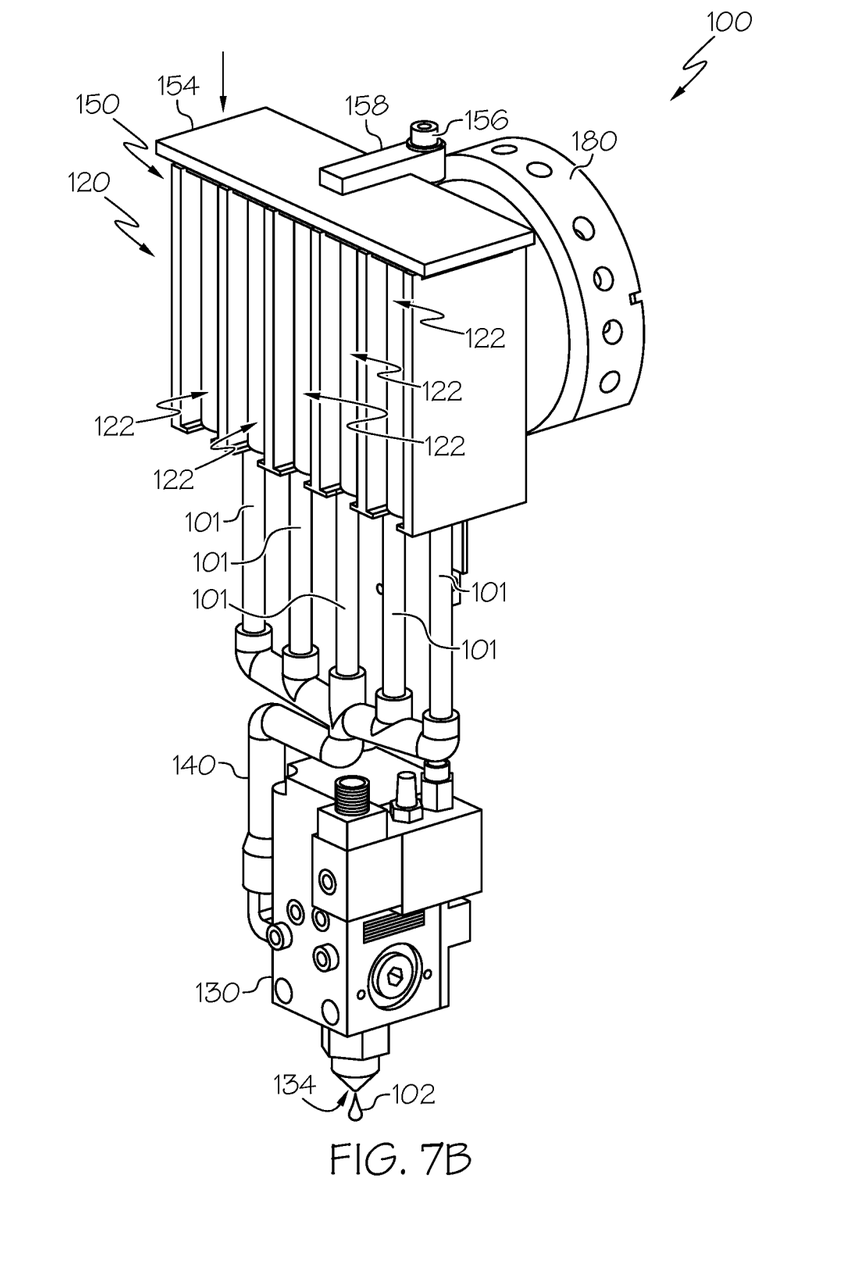
FIG. 7B is a schematic, perspective view of the robot end effector of FIG. 1, illustrating the pairs of plungers of FIG. 7A inserted into the two-part cartridges of FIG. 4B received in the robot end effector, according to one or more examples of the subject matter, disclosed herein.

Referring generally to FIG. 1 and particularly to, e.g., FIGS. 3, 4, and 7, non-rotating linear pneumatic actuator 160 comprises cylinder 161, attached to chassis 110, and piston 162, attached to plunger assembly 150 and received in cylinder 161. Piston 162 is non-rotatably slidable relative to cylinder 161. The preceding portion of this paragraph characterizes example two of the subject matter, disclosed herein, where example two also encompasses example one, above.

Cylinder 161 and piston 162 cooperate to provide an efficient and inexpensive implementation of non-rotating linear pneumatic actuator 160.

Referring generally to FIG. 1 and particularly to, e.g., FIGS. 3, 4, and 7, cylinder 161 and piston 162 are oriented lengthwise along axis 190, and non-rotating linear pneumatic actuator 160 is operable to selectively move pairs of plungers 152 along axis 190. The preceding portion of this paragraph characterizes example three of the subject matter, disclosed herein, where example three also encompasses example two, above.

Cylinder 161 and piston 162 oriented lengthwise along axis 190, and operable to cause movement of pairs of plungers 152 along axis 190, provides efficient actuation of plunger assembly 150 within spatial constraints for operation of robot end effector 100.

Referring generally to FIG. 1 and particularly to, e.g., FIGS. 3, 4, and 7, non-rotating linear pneumatic actuator 160 is operable to selectively move pairs of plungers 152 bi-directionally along axis 190. The preceding portion of this paragraph characterizes example four of the subject matter, disclosed herein, where example four also encompasses example three, above.

Non-rotating linear pneumatic actuator 160 being operable to selectively move pairs of plungers 152 bi-directionally along axis 190 enables rapid and efficient withdrawal of pairs of plungers 152 from emptied two-part cartridges 104, and accordingly facilitates rapid replacement of emptied two-part cartridges 104 with reduced down time of robot end effector 100.

Referring generally to FIG. 1 and particularly to, e.g., FIGS. 3, 4, and 7, cylinder 161 comprises extension inlet port 166. Non-rotating linear pneumatic actuator 160 is configured to move pairs of plungers 152 toward cartridge bays 122 along axis 190 in response to pressurized air supplied to extension inlet port 166. Cylinder 161 also comprises retraction inlet port 164. Non-rotating linear pneumatic actuator 160 is configured to move pairs of plungers 152 away from cartridge bays 122 along axis 190 in response to pressurized air, supplied to retraction inlet port 164. The preceding portion of this paragraph characterizes example five of the subject matter, disclosed herein, where example five also encompasses example three or four, above.

Extension inlet port 166 and retraction inlet port 164 facilitate efficient actuation of plunger assembly 150 within spatial constraints for operation of robot end effector 100.

Referring generally to FIG. 1 and particularly to, e.g., FIGS. 3, 4, and 7, plunger assembly 150 further comprises support plate 154 and mounting extension 158, attached to support plate 154. Piston 162 is attached to mounting extension 158. The preceding portion of this paragraph characterizes example six of the subject matter, disclosed herein, where example six also encompasses any one of examples two to five, above.

Support plate 154 and mounting extension 158 provide a mechanically simple and efficient connection between pairs of plungers 152 and non-rotating linear pneumatic actuator 160.

In one or more examples, piston 162 is secured to mounting extension 158 by fitting 156.

Referring generally to FIG. 1 and particularly to, e.g., FIGS. 3, 4, and 7, mounting extension 158 is cantilevered from support plate 154. The preceding portion of this paragraph characterizes example seven of the subject matter, disclosed herein, where example seven also encompasses example six, above.

Mounting extension 158 being cantilevered from support plate 154 enables positioning of non-rotating linear pneumatic actuator 160 side-by-side with cartridge bays 122, which facilitates efficient actuation of plunger assembly 150 within spatial constraints for operation of robot end effector 100.

Figure 2:
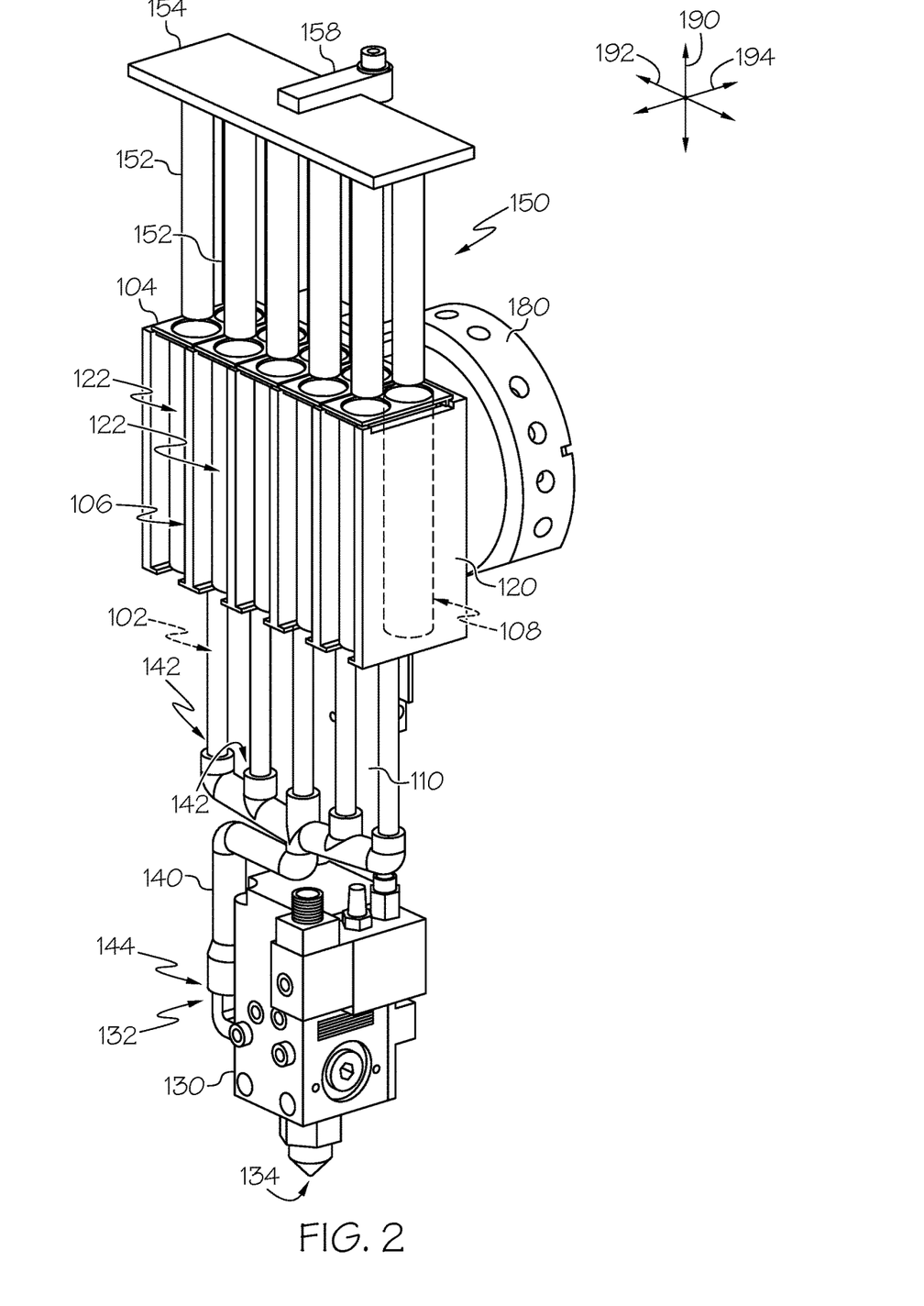
FIG. 2 is a schematic, perspective view of the robot end effector of FIG. 1, according to one or more examples of the subject matter, disclosed herein.
Figure 6A:
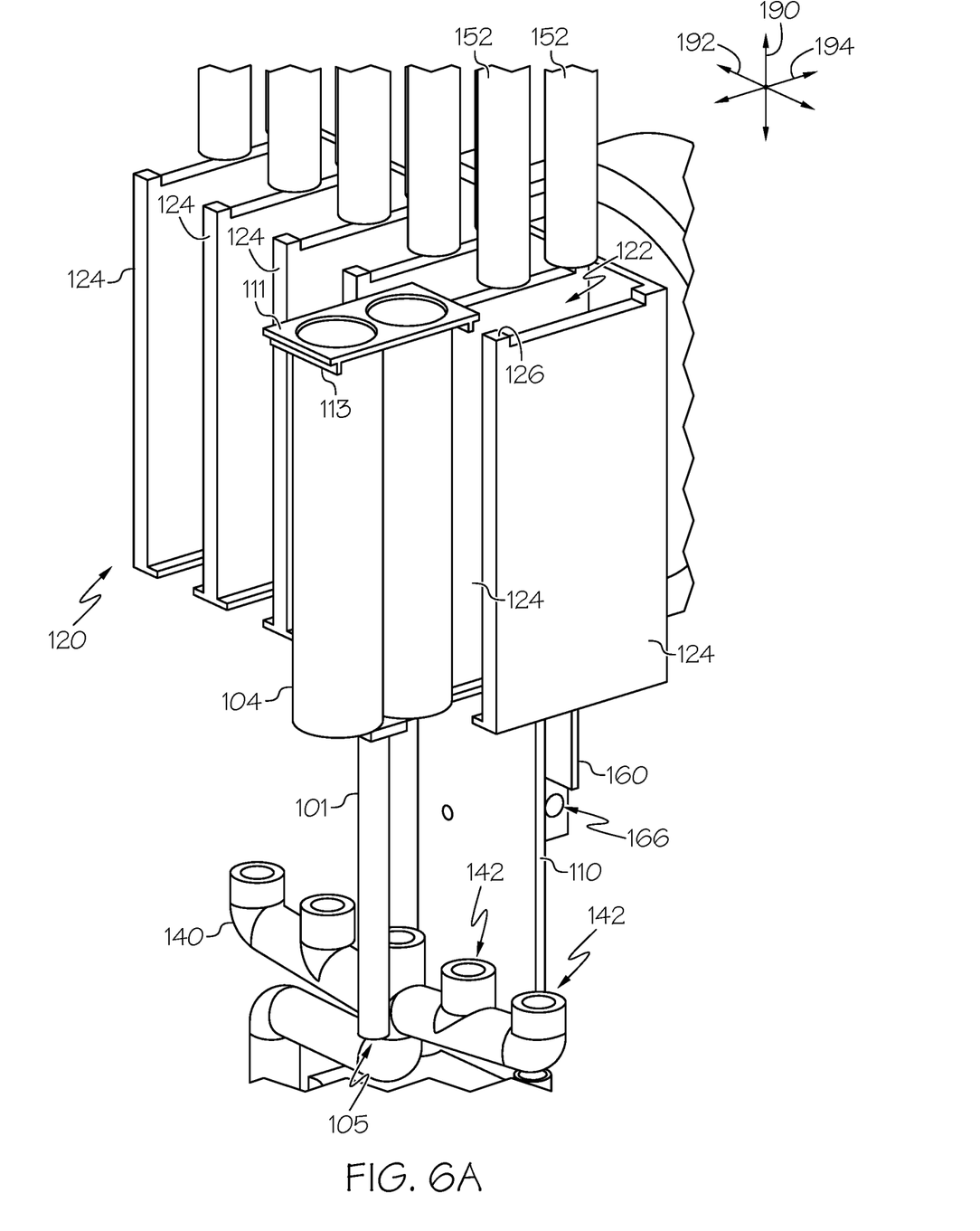
FIG. 6A is a schematic, perspective view of a portion of the robot end effector of FIG. 1, illustrating the assembled two-part cartridge and static mixer of FIG. 5B positioned for insertion into the robot end effector, according to one or more examples of the subject matter, disclosed herein.
Figure 6B:
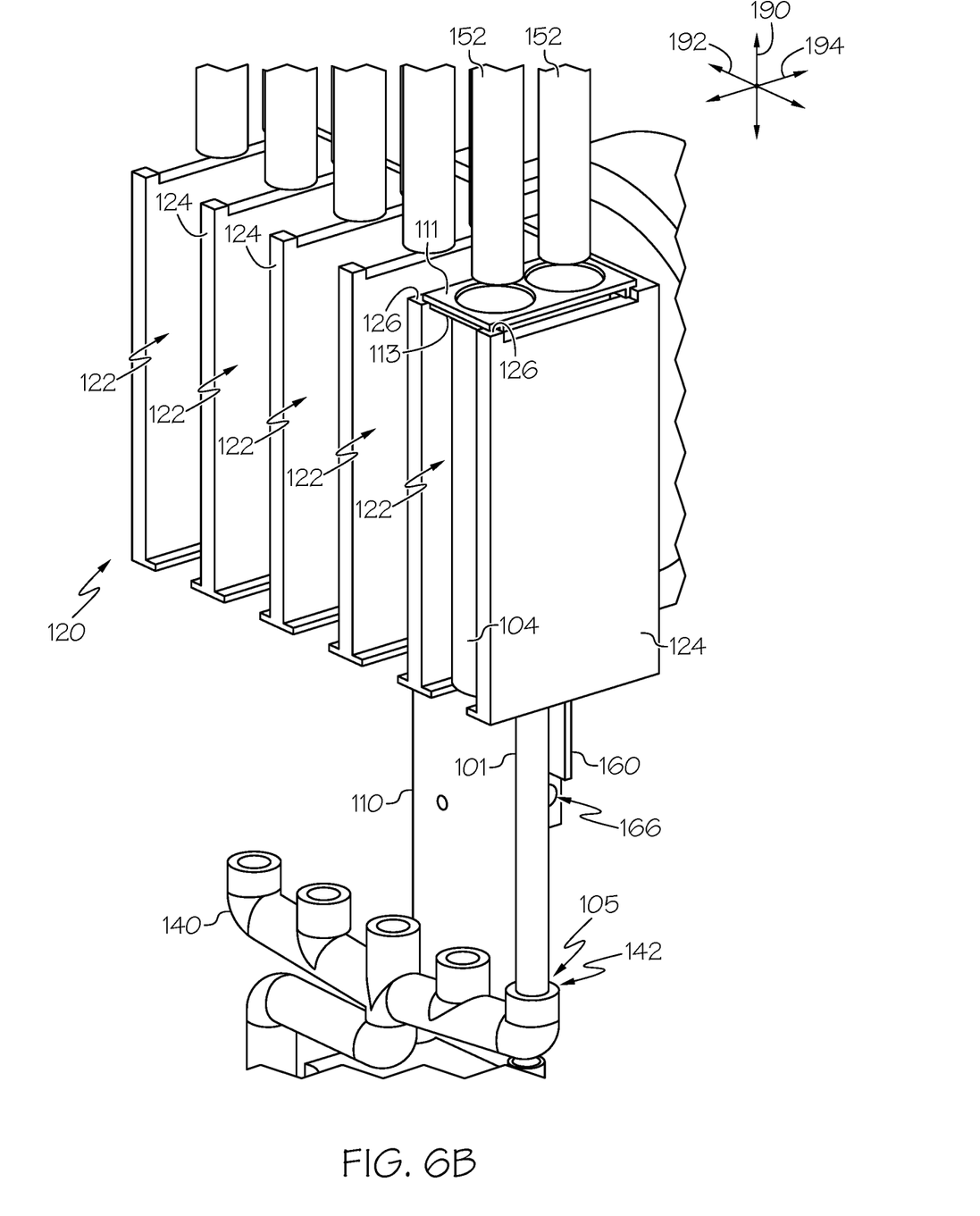
FIG. 6B is a schematic, perspective view of a portion of the robot end effector of FIG. 1, illustrating the assembled two-part cartridge and static mixer of FIG. 5B received into the robot end effector, according to one or more examples of the subject matter, disclosed herein.

Referring generally to FIG. 1 and particularly to, e.g., FIGS. 2 and 6, cartridge bays 122 are each oriented lengthwise along axis 190. Cartridge bays 122 are arranged side-by-side along second axis 192, transverse to axis 190. When two-part cartridges 104 are received by cartridge bays 122, first-part container 106 and second-part container 108 of each of two-part cartridges 104 are oriented side-by-side along third axis 194. Third axis 194 is transverse to axis 190 and to second axis 192. The preceding portion of this paragraph characterizes example eight of the subject matter, disclosed herein, where example eight also encompasses example one or two, above.

Cartridge bays 122 arranged side-by-side along second axis 192, and first-part container 106 and second-part container 108 of each of two-part cartridges 104 oriented side-by-side along third axis 194, provides efficient packing of two-part cartridges 104 within robot end effector 100 while enabling easy insertion and removal of two-part cartridges 104.

Referring generally to FIG. 1 and particularly to, e.g., FIGS. 5 and 6, each of cartridge bays 122 comprises retention feature 126, shaped to retain two-part cartridges 104 in cartridge bays 122. The preceding portion of this paragraph characterizes example nine of the subject matter, disclosed herein, where example nine also encompasses any one of examples one to eight, above.

Retention features 126 facilitate proper positioning and retention of two-part cartridges 104 within cartridge bays 122.

Referring generally to FIG. 1 and particularly to, e.g., FIG. 6, retention feature 126 is a protuberance. The preceding portion of this paragraph characterizes example ten of the subject matter, disclosed herein, where example ten also encompasses example nine, above.

Retention feature 126 being a protuberance facilitates proper positioning and retention of two-part cartridges 104 within cartridge bays 122 in a mechanically simple and effective fashion.

In one or more examples, each of two-part cartridges 104 includes lip 111 as a standard feature, extending around a perimeter of a top end of first-part container 106 and second-part container 108. In one or more examples, two-part cartridges 104 further include ridges 113, protruding transversely from lip 111, and retention feature 126 of each of cartridge bays 122 interacts with ridge 113 of the corresponding one of two-part cartridges 104.

Referring generally to FIG. 1 and particularly to, e.g., FIGS. 5 and 6, when two-part cartridges 104 are retained in cartridge bays 122, pairs of plungers 152 are aligned with corresponding working axes 191 of two-part cartridges 104. The preceding portion of this paragraph characterizes example eleven of the subject matter, disclosed herein, where example eleven also encompasses example nine or ten, above.

Pairs of plungers 152 being aligned with corresponding working axes 191 of two-part cartridges 104 provides for mechanically simple and efficient engagement of plunger assembly 150 and pistons 107 disposed internally within two-part cartridges 104.

Referring generally to FIG. 1 and particularly to, e.g., FIGS. 5 and 6, when two-part cartridges 104 are retained in cartridge bays 122, manifold inlets 142 receive mixer outlets 105 of static mixers 101, attached to two-part cartridges 104. The preceding portion of this paragraph characterizes example twelve of the subject matter, disclosed herein, where example twelve also encompasses any one of examples nine to eleven, above.

Cartridge bays 122 positioned such that mixer outlets 105 of static mixers 101 are received in manifold inlets 142 when two-part cartridges 104 are retained in cartridges bays 122 facilitates simple and efficient installation and connection of two-part cartridges 104 on robot end effector 100.

Referring generally to FIG. 1 and particularly to, e.g., FIGS. 2 and 4, robot end effector 100 further comprises connector 180, attached to chassis 110. Dispensing valve 130 is controllable by electrical signals, received through connector 180. The preceding portion of this paragraph characterizes example thirteen of the subject matter, disclosed herein, where example thirteen also encompasses any one of examples one to twelve, above.

Connector 180 facilitates simple and efficient electrical connection of dispensing valve 130 to a source of control signals.

In one or more examples, connector 180 is a quick-change connector, configured to interface mechanically with an arm of a robot (not shown), so as to attach robot end effector 100 physically to the robot, and electrically with a control system (not shown) of the robot, so as to enable and integrate control of dispensing valve 130 with the control logic of the robot. In one or more examples, dispensing valve 130 is a servo-valve, controlled by the electrical signals, received via connector 180.

Referring generally to FIG. 1 and particularly to, e.g., FIGS. 2, 3, and 4, robot end effector 100 further comprises connector 180, attached to chassis 110, wherein non-rotating linear pneumatic actuator 160 is controllable by pressurized air, received through connector 180. The preceding portion of this paragraph characterizes example fourteen of the subject matter, disclosed herein, where example fourteen also encompasses any one of examples one to thirteen, above.

Non-rotating linear pneumatic actuator 160 being controllable by pressurized air received through connector 180 facilitates integrating control of plunger assembly 150 with control of other elements of robot end effector 100.

Referring generally to FIG. 1 and particularly to, e.g., FIG. 6, cartridge bays 122 are defined by walls 124, parallel to one another and spaced apart from each other. Each of cartridge bays 122 is partially bounded by a corresponding pair of adjacent ones of walls 124. The preceding portion of this paragraph characterizes example fifteen of the subject matter, disclosed herein, where example fifteen also encompasses any one of examples one to fourteen, above.

Walls 124 provide a structurally simple implementation of cartridge bays 122 on robot end effector 100 that enables easy insertion and removal of two-part cartridges 104.

In one or more examples, robot end effector 100 further includes cartridge-bay assembly 120, which includes walls 124. Each of cartridge bays 122 is defined by cartridge-bay assembly 120, including walls 124, and is oriented lengthwise along axis 190.

Referring generally to FIG. 1 and particularly to, e.g., FIGS. 2 and 6, cartridge bays 122 are equal in number to manifold inlets 142, and manifold inlets 142 are equal in number to pairs of plungers 152. The preceding portion of this paragraph characterizes example sixteen of the subject matter, disclosed herein, where example sixteen also encompasses any one of examples one to fifteen, above.

Pairs of plungers 152, cartridge bays 122, and manifold inlets 142 being equal in number provides a simple and efficient implementation of parallel actuation of two-part cartridges 104, and accommodates channeling of a resulting parallel flow of extrudable substance 102 from two-part cartridges 104 into manifold 140 toward dispensing valve 130.

Figure 8A:
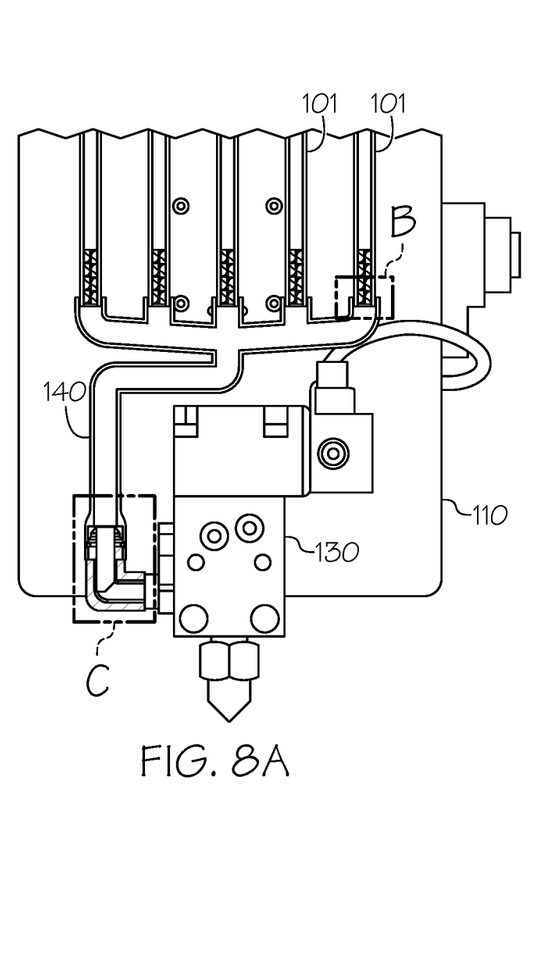
FIG. 8A is a schematic, front, elevation, partial cutaway view of another portion of the robot end effector of FIG. 1, including a manifold of the robot end effector, according to one or more examples of the subject matter, disclosed herein.
Figure 8B:
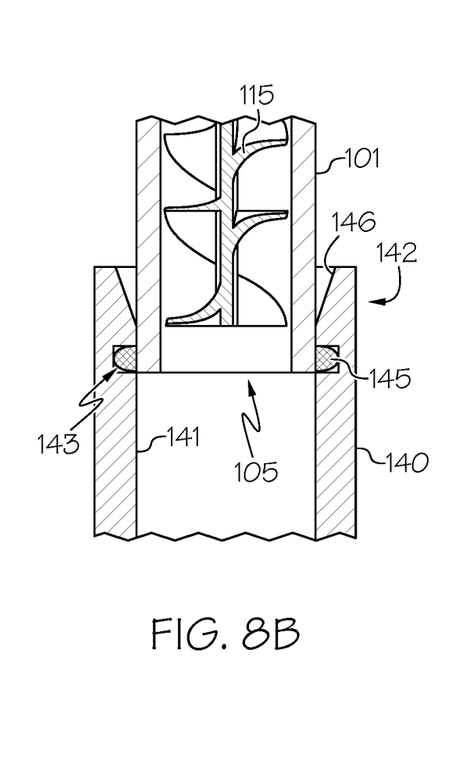
FIG. 8B is a schematic, elevation, sectional view of detail region B of FIG. 8A, illustrating an interface between the static mixer of FIG. 5A and an inlet of the manifold of the robot end effector of FIG. 1, according to one or more examples of the subject matter, disclosed herein.

Referring generally to FIG. 1 and particularly to, e.g., FIG. 8B, each of manifold inlets 142 comprises manifold-inlet interior wall 141, comprising end portion 146 that is tapered. The preceding portion of this paragraph characterizes example seventeen of the subject matter, disclosed herein, where example seventeen also encompasses any one of examples one to sixteen, above.

Tapered end portion 146 of manifold-inlet interior wall 141 facilitates capturing and guiding mixer outlets 105 of static mixers 101 into manifold inlets 142 during installation of two-part cartridges 104.

Referring generally to FIG. 1 and particularly to, e.g., FIG. 8B, manifold inlets 142 each comprise manifold-inlet interior wall 141 and inlet groove 143, defined in, and extending circumferentially around, manifold-inlet interior wall 141. Manifold inlets 142 each also comprise inlet O-ring 145, received in inlet groove 143 and configured, when two-part cartridges 104 are received by cartridge bays 122, to seal an interface between each one of manifold inlets 142 and a corresponding one of mixer outlets 105 of static mixers 101, attached to the corresponding one of two-part cartridges 104. The preceding portion of this paragraph characterizes example eighteen of the subject matter, disclosed herein, where example eighteen also encompasses any one of examples one to eleven, above.

Inlet O-ring 145 received in inlet groove 143 facilitates a reliable seal at the interface between manifold inlet 142 and the corresponding one of mixer outlets 105.

Figure 8C:
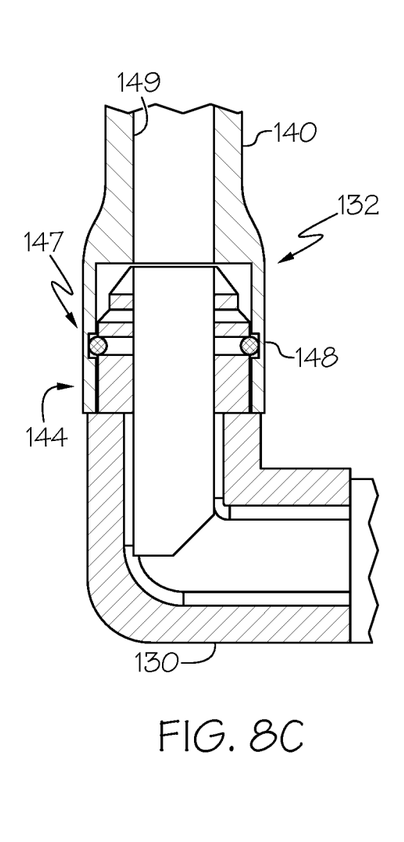
FIG. 8C is a schematic, elevation, sectional view of detail region C of FIG. 8A, illustrating an interface between an outlet of the manifold of the robot end effector of FIG. 1 and an inlet of a dispensing valve of the robot end effector, according to one or more examples of the subject matter, disclosed herein.

Referring generally to FIG. 1 and particularly to, e.g., FIG. 8C, manifold outlet 144 comprises manifold-outlet interior wall 149 and outlet groove 147, defined in, and extending circumferentially around, manifold-inlet interior wall 141. Manifold outlet 144 also comprises outlet O-ring 148, received in outlet groove 147 and sealing an interface between manifold outlet 144 and valve inlet 132. The preceding portion of this paragraph characterizes example nineteen of the subject matter, disclosed herein, where example nineteen also encompasses example eighteen, above.

Outlet O-ring 148 received in outlet groove 147 facilitates a reliable seal at the interface between manifold outlet 144 and valve inlet 132 of dispensing valve 130.

Figure 9A:
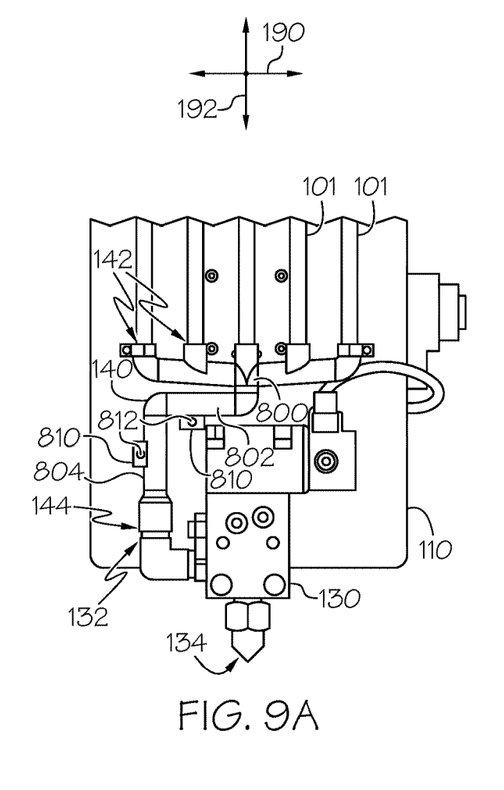
FIG. 9A is a schematic, front, elevation view of a portion of the robot end effector of FIG. 1, including a manifold of the robot end effector, according to one or more examples of the subject matter, disclosed herein.
Figure 9B:
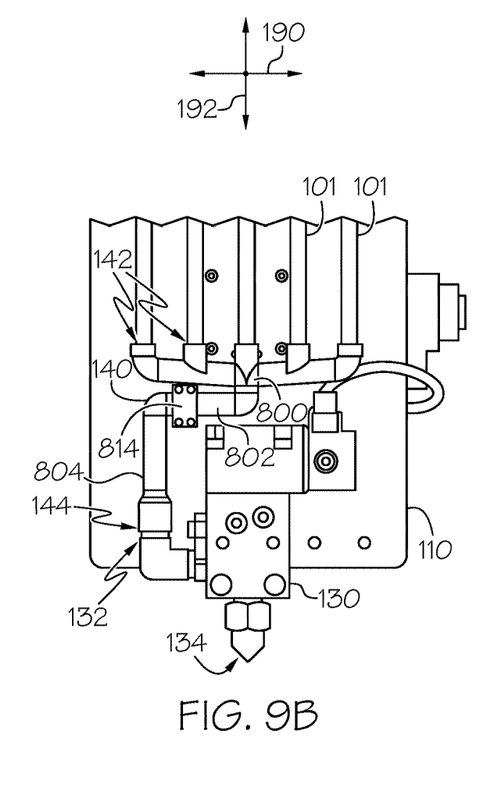
FIG. 9B is a schematic, front, elevation view of a portion of the robot end effector of FIG. 1, including a manifold of the robot end effector, according to one or more examples of the subject matter, disclosed herein.

Referring generally to FIG. 1 and particularly to, e.g., FIGS. 9A and 9B, manifold 140 further comprises junction 800. Manifold inlets 142 are parallel to axis 190 and are in fluidic communication with junction 800. Manifold 140 also comprises first leg 802, extending from junction 800 along second axis 192, transverse to axis 190, and second leg 804, extending between first leg 802 and manifold outlet 144 along axis 190. The preceding portion of this paragraph characterizes example twenty of the subject matter, disclosed herein, where example twenty also encompasses example one or two, above.

First leg 802 extending from junction 800 along second axis 192, in cooperation with second leg 804 extending between first leg 802 and manifold outlet 144 along axis 190, facilitates routing extrudable substance 102 from static mixers 101 around a body of dispensing valve 130 to valve inlet 132, located on a side of dispensing valve 130.

For example, dispensing valve 130 is a commercial off-the-shelf servo-valve, having valve inlet 132, offset from valve outlet 134 relative to axis 190.

Referring generally to FIG. 1 and particularly to, e.g., FIGS. 9A and 9B, junction 800 is centrally located relative to manifold inlets 142 along second axis 192. The preceding portion of this paragraph characterizes example twenty-one of the subject matter, disclosed herein, where example twenty-one also encompasses example twenty, above.

Junction 800 being centrally located relative to manifold inlets 142 along second axis 192 reduces a moment, induced by a parallel flow of extrudable substance 102 into manifold inlets 142, which in turn improves stability of the fluidic communication between manifold inlets 142 and static mixers 101.

Referring generally to FIG. 1 and particularly to, e.g., FIGS. 9A and 9B, valve outlet 134 is centrally located relative to manifold inlets 142 along second axis 192. The preceding portion of this paragraph characterizes example twenty-two of the subject matter, disclosed herein, where example twenty-two also encompasses example twenty-one, above.

Valve outlet 134 being centrally located relative to manifold inlets 142 along second axis 192 enables valve outlet 134 to be centrally located along second axis 192 relative to chassis 110, which reduces a complexity of determining and controlling a dispensing location of valve outlet 134.

Referring generally to FIG. 1 and particularly to, e.g., FIG. 9A, robot end effector 100 further comprises manifold tab 810, formed integrally with manifold 140. Robot end effector 100 also comprises manifold fastener 812, received through manifold tab 810 and attached to chassis 110. The preceding portion of this paragraph characterizes example twenty-three of the subject matter, disclosed herein, where example twenty-three also encompasses any one of examples twenty to twenty-two, above.

Manifold tab 810 attached to chassis 110 by manifold fastener 812 reacts a moment on manifold 140, induced by a flow of extrudable substance 102 from manifold outlet 144 into valve inlet 132.

Referring generally to FIG. 1 and particularly to, e.g., FIG. 9B, robot end effector 100 further comprises manifold bracket 814, attaching first leg 802 of manifold 140 to chassis 110. The preceding portion of this paragraph characterizes example twenty-four of the subject matter, disclosed herein, where example twenty-four also encompasses any one of examples twenty to twenty-two, above.

Manifold bracket 814 attaching first leg 802 of manifold 140 to chassis 110 reacts a moment on manifold 140, induced by a flow of extrudable substance 102 from manifold outlet 144 into valve inlet 132.

Figure 9C:
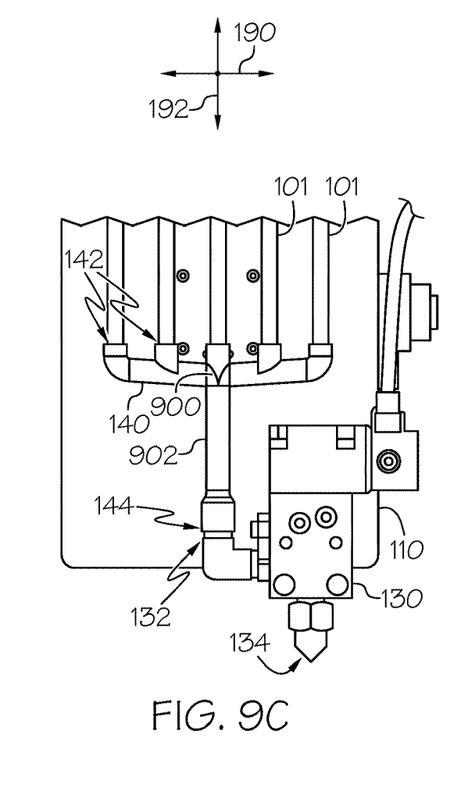
FIG. 9C is a schematic, front, elevation view of a portion of the robot end effector of FIG. 1, including a manifold of the robot end effector, according to one or more examples of the subject matter, disclosed herein.

Referring generally to FIG. 1 and particularly to, e.g., FIG. 9C, manifold 140 further comprises junction 900. Manifold inlets 142 are parallel to axis 190 and are in fluidic communication with junction 900. Manifold 140 also comprises single leg 902, extending from junction 900 to manifold outlet 144 along axis 190. The preceding portion of this paragraph characterizes example twenty-five of the subject matter, disclosed herein, where example twenty-five also encompasses example one or two, above.

Single leg 902 extending from junction 900 to manifold outlet 144 along axis 190 reduces a moment, induced on manifold 140 by the flow of extrudable substance 102 from manifold outlet 144 into valve inlet 132.

Referring generally to FIG. 1 and particularly to, e.g., FIG. 9C, manifold inlets 142 are spaced along second axis 192 in a symmetric arrangement, centered on junction 900 and on single leg 902 of manifold 140. Second axis 192 is transverse to axis 190. The preceding portion of this paragraph characterizes example twenty-six of the subject matter, disclosed herein, where example twenty-six also encompasses example twenty-five, above.

Manifold inlets 142 being spaced along second axis 192 in a symmetric arrangement, centered on junction 900 and on single leg 902, reduces a moment, induced by a parallel flow of extrudable substance 102 into manifold inlets 142, which in turn improves stability of the fluidic communication between manifold inlets 142 and static mixers 101.

Referring generally to FIG. 1 and particularly to, e.g., FIG. 9C, valve outlet 134 is offset from single leg 902 of manifold 140 along second axis 192. The preceding portion of this paragraph characterizes example twenty-seven of the subject matter, disclosed herein, where example twenty-seven also encompasses example twenty-six, above.

Valve outlet 134 being offset from single leg 902 of manifold 140 along second axis 192 facilitates a direct channel for the extrudable substance along axis 190 from junction 900 to valve inlet 132, located on a side of dispensing valve 130.

For example, dispensing valve 130 is a commercial off-the-shelf servo-valve, having valve inlet 132 offset from valve outlet 134, relative to axis 190.

Referring generally to FIG. 1 and particularly to, e.g., FIGS. 2 and 4, chassis 110 comprises first end 114 and second end 116, spaced away from first end 114. Cartridge bays 122 are mounted at first end 114 of chassis 110, and dispensing valve 130 is mounted at second end 116 of chassis 110. The preceding portion of this paragraph characterizes example twenty-eight of the subject matter, disclosed herein, where example twenty-eight also encompasses any one of examples twenty-five to twenty-seven, above.

Cartridge bays 122 spaced away from dispensing valve 130 on chassis 110 enable easy access to an interface between static mixers 101 and manifold 140, and facilitates ease and rapidity of connection and disconnection of static mixers 101 and manifold 140 when two-part cartridges 104 that are empty are removed from robot end effector 100 and two-part cartridges 104 that are full are installed.

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

The invention claimed is:

1. A robot end effector for dispensing an extrudable substance, the robot end effector comprising:
    a chassis;
    cartridge bays, attached to the chassis and each shaped to receive a corresponding one of two-part cartridges;
    a dispensing valve, attached to the chassis and comprising a valve inlet and a valve outlet, wherein the valve outlet is in selective fluidic communication with the valve inlet;
    a manifold, comprising a manifold outlet and manifold inlets, which are in fluidic communication with the manifold outlet, wherein:
        the manifold outlet is in fluidic communication with the valve inlet, and
        when the two-part cartridges are received by the cartridge bays, the manifold inlets are in fluidic communication with corresponding ones of the two-part cartridges via static mixers, attached to cartridge outlets of the two-part cartridges;
    a plunger assembly, comprising pairs of plungers and arranged to concurrently extrude contents of the two-part cartridges through the cartridge outlets when the two-part cartridges are received by the cartridge bays; and
    a non-rotating linear pneumatic actuator, attached to the chassis and configured to selectively move the plunger assembly relative to the chassis.

2. The robot end effector according to claim 1, wherein the non-rotating linear pneumatic actuator comprises:
    a cylinder, attached to the chassis; and
    a piston, attached to the plunger assembly and received in the cylinder, wherein the piston is non-rotatably slidable relative to the cylinder.

3. The robot end effector according to claim 2, wherein:
    the cylinder and the piston are oriented lengthwise along an axis; and
    the non-rotating linear pneumatic actuator is operable to selectively move the pairs of plungers along the axis.

4. The robot end effector according to claim 3, wherein the non-rotating linear pneumatic actuator is operable to selectively move the pairs of plungers bi-directionally along the axis.

5. The robot end effector according to claim 2, wherein the plunger assembly further comprises:
    a support plate and
    a mounting extension, attached to the support plate, wherein the piston is attached to the mounting extension.

6. The robot end effector according to claim 5, wherein the mounting extension is cantilevered from the support plate.

7. The robot end effector according to claim 1, wherein:
    the cartridge bays are each oriented length-wise along an axis;
    the cartridge bays are arranged side-by-side along a second axis, transverse to the axis;
    when the two-part cartridges are received by the cartridge bays, a first-part container and a second-part container of each of the two-part cartridges are oriented side-by-side along a third axis; and
    the third axis is transverse to the axis and to the second axis.

8. The robot end effector according to claim 1, further comprising a connector, attached to the chassis, wherein the dispensing valve is controllable by electrical signals, received through the connector.

9. The robot end effector according to claim 1, further comprising a connector, attached to the chassis, wherein the non-rotating linear pneumatic actuator is controllable by pressurized air, received through the connector.

10. The robot end effector according to claim 1, wherein:
    the cartridge bays are defined by walls, parallel to one another and spaced apart from each other; and
    each of the cartridge bays is partially bounded by a corresponding pair of adjacent ones of the walls.

11. The robot end effector according to claim 1, wherein:
    the cartridge bays are equal in number to the manifold inlets, and
    the manifold inlets are equal in number to the pairs of plungers.

12. The robot end effector according to claim 1, wherein the manifold inlets each comprise:
    a manifold-inlet interior wall;
    an inlet groove, defined in, and extending circumferentially around, the manifold-inlet interior wall; and an inlet O-ring, received in the inlet groove and configured, when the two-part cartridges are received by the cartridge bays, to seal an interface between each one of the manifold inlets and a corresponding one of mixer outlets of the static mixers, attached to the corresponding one of the two-part cartridges.

13. The robot end effector according to claim 12, wherein the manifold outlet comprises:
a manifold-outlet interior wall;
an outlet groove, defined in, and extending circumferentially around, the manifold-inlet interior wall; and
an outlet O-ring, received in the outlet groove and sealing an interface between the manifold outlet and the valve inlet.

14. The robot end effector according to claim 1, wherein the manifold further comprises:
a junction, wherein the manifold inlets are parallel to an axis and are in fluidic communication with the junction;
a first leg, extending from the junction along a second axis, transverse to the axis; and
a second leg, extending between the first leg along the axis.

15. The robot end effector according to claim 14, further comprising:
a manifold tab, formed integrally with the manifold; and
a manifold fastener, received through the manifold tab and attached to the chassis.

16. The robot end effector according to claim 14, further comprising a manifold bracket, attaching the first leg of the manifold to the chassis.

17. The robot end effector according to claim 1, wherein the manifold further comprises:
a junction, wherein the manifold inlets are parallel to a first axis and are in fluidic communication with the junction; and
a single leg, extending from the junction to the manifold outlet along the first axis.

18. The robot end effector according to claim 17, wherein:
the manifold inlets are spaced along a second axis in a symmetric arrangement, centered on the junction and on the single leg of the manifold; and
the second axis is transverse to the axis.

19. The robot end effector according to claim 18, wherein the valve outlet is offset from the single leg of the manifold along the second axis.

20. The robot end effector according to claim 17, wherein:
the chassis comprises a first end and a second end, spaced away from the first end;
the cartridge bays are mounted at the first end of the chassis; and
the dispensing valve is mounted at the second end of the chassis.

* * * * *